United States Patent
Lee

(10) Patent No.: US 8,206,190 B2
(45) Date of Patent: Jun. 26, 2012

(54) AMPHIBIOUS FIGHTING VEHICLE RUNNING ON LAND AND WATER SURFACES

(76) Inventor: Jong Soo Lee, Seoul (KR)

( * ) Notice: Subject to any disclaimer, the term of this patent is extended or adjusted under 35 U.S.C. 154(b) by 62 days.

(21) Appl. No.: 12/847,581

(22) Filed: Jul. 30, 2010

(65) Prior Publication Data

US 2011/0111651 A1 May 12, 2011

(30) Foreign Application Priority Data

Aug. 11, 2009 (KR) .................. 10-2009-0073759

(51) Int. Cl.
*B60F 3/00* (2006.01)
(52) U.S. Cl. .................................. 440/12.63; 114/67 R
(58) Field of Classification Search ............. 180/6.2–10; 440/12.5, 12.56, 12.63, 12.64, 95; 114/67 R
See application file for complete search history.

(56) References Cited

U.S. PATENT DOCUMENTS

| | | | |
|---|---|---|---|
| 2,413,850 A * | 1/1947 | Swennes | 440/12.64 |
| 2002/0022415 A1* | 2/2002 | Choi et al. | 440/12.5 |
| 2009/0124142 A1* | 5/2009 | Wernicke et al. | 440/12.63 |

* cited by examiner

*Primary Examiner* — Edwin Swinehart
(74) *Attorney, Agent, or Firm* — Oblon, Spivak, McClelland, Maier & Neustadt, L.L.P.

(57) ABSTRACT

An amphibious fighting vehicle capable of moving on a water surface including a front planing tracked belt disposed on a front portion of the amphibious fighting vehicle, a rear driving tracked belt, side buoys disposed on lateral sides of the amphibious fighting vehicle, a rear buoy disposed on a rear end of the amphibious fighting vehicle, the buoys assisting in setting an immersion line of the amphibious fighting vehicle at a predetermined value, and a set of identical engines that propel the amphibious fighting vehicle at a speed sufficient for movement on the water surface and a land surface.

6 Claims, 5 Drawing Sheets

AMPHIBIOUS FIGHTING VEHICLE RUNNING ON LAND AND WATER SURFACES

CROSS REFERENCE TO RELATED APPLICATIONS

This specification claims priority and contains subject matter related to Korean Patent Application No. 2009-0073759 filed on Aug. 11, 2009 and U.S. Provisional Application No. 61/332,072 filed on May 6, 2010. The entire contents of both KR 2009-0073759 and U.S. 61/332,072 are incorporated herein by reference.

BACKGROUND OF THE INVENTION

1. Field of the Invention

Exemplary aspects of the present invention relate to an amphibious fighting vehicle which can run on both surfaces of the land and the water.

2. Discussion of the Background

In 21st Century, amphibious operations depend heavily on OTH (Over-The-Horizon) strategy since a hostile shore may be armed with 50 Km range artillery or 80 Km range missiles. Thus, it is well acknowledged that OTH operation should start at 100 Km away from the hostile shore, land the shore and suppress the fire capabilities of the shore armed forces in order to deploy the marines safely on land. This kind of operation is ideally finished within 90 minutes for the follow-on-forces. As a key role, an amphibious fighting vehicle would ideally satisfy these combat requirements.

A conventional amphibious vehicle wades through a wave in the water much like a boat. In another example, an amphibious vehicle glides on the surface of water and is propelled by multiple high-powered water jets.

Further, there are other known examples of traversing a body of water on the surface, thereof. For example, a particular basilisk lizard is capable of running on the surface of water utilizing an elevation force herein referred to as impulse. The basilisk lizard steps approximately 20 times per second with phases of slap and stroke. A second example may be illustrated by throwing a round and flat pebble toward the water surface to skip or bounce several times until it falls below the surface. A possible reason why the pebble "skips" across the water surface is that it steadies itself at the instant when it hits the surface of the water since the friction is very high during the contact with the water surface. That is, it remains halted with no slip and bounces to a certain height.

Referring to the skipping pebble, the last bounce before it falls below the water surface illustrates the impulse phenomenon. The impulse onto the water allows the pebble to stay on the surface of water, being sustained by the equivalent force of the pebble's weight. The basilisk and the pebble illustrate the basic principle of Newtonian Physics, such that, a change of momentum is equal to impulse (Force by Time). Accordingly, the source of elevation force such that the pebble and basilisk lizard can stay on the surface of water comes from the impulse caused by the provided momentum.

SUMMARY OF THE INVENTION

In an exemplary embodiment, an amphibious fighting vehicle that is capable of moving on a water surface includes a front planing tracked belt disposed on a front portion of the amphibious fighting vehicle, the front planing tracked belt is disposed relatively lower on the amphibious fighting vehicle than a rear driving tracked belt; side buoys disposed on lateral sides of the amphibious fighting vehicle that assist in setting an immersion line of the amphibious fighting vehicle at a predetermined value; a rear buoy disposed on a rear end of the amphibious fighting vehicle; and a set of identical engines that propel the amphibious fighting vehicle at a speed sufficient for movement on the water surface and a land surface.

BRIEF DESCRIPTION OF THE DRAWINGS

A more complete appreciation of the disclosure and the aspects, features, and advantages thereof will become apparent upon consideration of the following description of the preferred embodiments of the present invention taken in conjunction with the accompanying drawings, wherein.

DETAILED DESCRIPTION OF THE PREFERRED EMBODIMENTS

As described above, aspects of the present invention are directed towards an OTH operation. In particular, aspects are related to a fast running belt-tracked vehicle both on surfaces of the land and the water. For example, under the critical speed in the water, a vehicle, in accordance with an exemplary embodiment of the invention, is plowing through the wave much like a typical buoyancy vehicles does. However, once the critical speed is reached, the exemplary vehicle's tracked belt emerges from the water onto the surface of the water and runs smoothly on the surface with its own acceleration. The tracked belt of the exemplary vehicle contacts the surface of the water with its rolling friction. The exemplary vehicle not only can land on the shore but also run back onto the water from the shore without any hesitation at a speed greater than the critical speed.

Exemplary embodiments of this invention will be better appreciated and understood through a perusal of the attached drawing figures in conjunction with reading the description of the invention set forth as follows.

Figure 1:
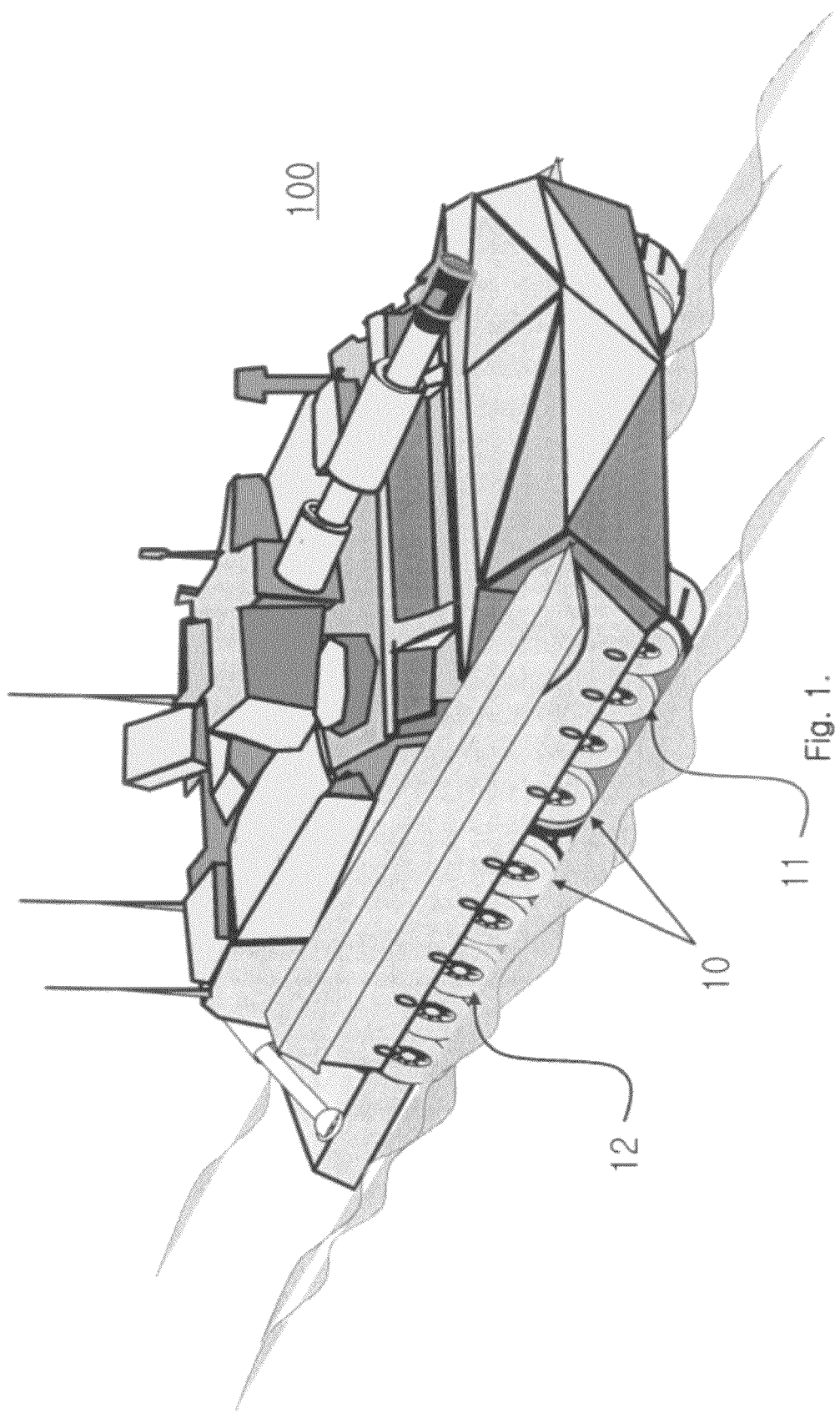
FIG. 1 is a representative drawing of a first embodiment of an amphibious fighting vehicle, over the critical speed, that runs on the surface of water with planing and driving tracked belts.

FIG. 1 presents a view of a first embodiment. FIG. 1 illustrates an amphibious fighting vehicle (100) which runs at a higher speed than the critical one. The front belts of the mentioned vehicle are constructed with left and right hand sets comprising two rowed four piece sets of tires (10) and two planing low tracks (11), which plane the coming wave and proceed to rotate by the rolling friction. Further, the rear belts are constructed with left and right hand sets comprising two rowed five piece sets of tires (10) and two driving high tracks of which let the amphibious fighting vehicle (100) run on the surface of water by the rolling friction as well.

The following are such conditions that allow the amphibious fighting vehicle (100) to run on the surface of water. The full area of tracks that contact the water surface is set as "A", and the weight of the vehicle is set as "W". Further, the speed that the exemplary vehicle can run on the surface of water is defined by "VC". The drag thereby caused can be expressed by the following formula.

$$D = \tfrac{1}{2} \times \rho_w \times A \times V_C^2 \times C_D \quad (1)$$

In the above formula (1), "ρw" is the density of the water. Also, such a certain condition that the amphibious fighting vehicle (100) stays on the surface of water is that the contact area of the vehicle's track to the water surface should sustain the total weight of the vehicle by its equivalent pressure "P". That is, $$P \times A = W \quad (2)$$

At the critical speed that the amphibious fighting vehicle (100) runs on the surface of water, since its momentum change is equal to the impulse, the following formula can be derived.

$$D \times \Delta T = \frac{W}{g} \times V_C \quad (3)$$

At this time, suppose the amphibious vehicle (100) runs on the surface of water by a Coulomb rolling friction "μ", the formula (2) and (3) fall in the following relationship.

$$D = \mu \times W \quad (4)$$

Wherein a condition that the amphibious vehicle (100) runs on the surface of water means that the track surface of vehicle should rotate, under no slip condition, together with the water surface.
That is, $$\mu = 1.0 \quad (5)$$

Also, since The coefficient of drag "CD" for the flat track belt is to be 1.0, the critical speed "VC" that the amphibious fighting vehicle (100) runs on the surface of water is given by $$V_C = \sqrt{\frac{2 \times W}{\rho_W \times A}} \quad (6)$$

As the above, once the critical speed "VC" is obtained, a stay time "ΔT" can be computed as follows, $$\Delta T = \frac{V_C}{g} \quad (7)$$

The radius "R" of tires surrounded by the track belt that rotates with critical line speed "VC" is given by the following formula.

$$R = \frac{g \times \Delta T^2}{\pi} \quad (8)$$

Also, the contact area "A" of the belt track that the amphibious fighting vehicle (100) requires to run on the surface of water is given by:

$$A = \frac{2 \times W}{\rho_W \times V_C^2} \quad (9)$$

By the above formulas (1) to (9), it is possible to design the amphibious fighting vehicle (100) that runs on the surface of water. Suppose the operational maximum speed on the water surface is set "VM", the corresponding power "HP" as required can be estimated as follows, $$HP = (W \times V_M + \tfrac{1}{2} \times \rho_{Air} \times A_F \times V_M^3)/755 \quad (10)$$

In the above formula, "$\rho_{Air}$" is the air density, and "AF" is the frontal area of the amphibious fighting vehicle (100). Since the diameter of the tires that is computed by use of the above formula is given by 0.75, the amphibious fighting vehicle (100) can run on the surface of water by faster speed than 13 km/hr of the critical one. Here, the critical speed is a function of formula (6). Since the surface pressure that is produced at a time when the track rotates by the power given by the engine and the momentum that is provided to the track by this continued supply of the power supports the total weight of the vehicle, the amphibious fighting vehicle (100) can run on the surface of water.

In case the maximum speed on the surface of water reaches 120 km/hr, the required power of engine at this speed can be obtained from the added value of the rolling frictional resistance at the corresponding speed with the drag due to the air resistance on the water surface. For example, if the corresponding vehicle weighs 30 ton, the required horsepower of the engine turns out to be 1,650 HP. It can be said that this is a sufficient power source enough for this vehicle to run on land with a speed of 80 km/hr, depending on the surface conditions of the road.

Figure 2:
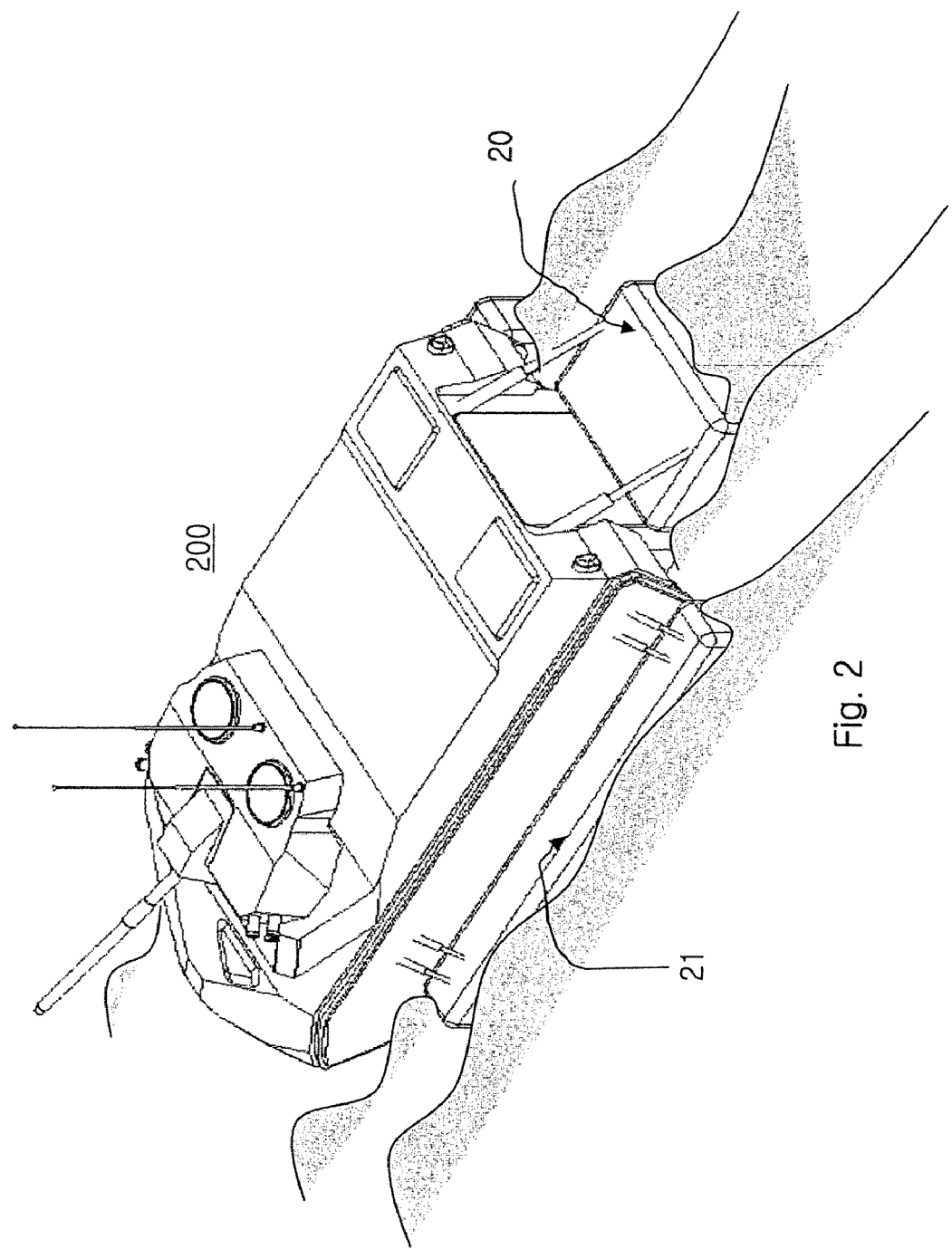
FIG. 2 is a view of the first embodiment, with additional buoyancies, moving in the water under the immersion line.

FIG. 2 shows such a view that the amphibious fighting vehicle (100) keeps its immersion line as designed with aids of additional buoyancy of rear buoy (20) and side buoys (21 and 22, being not shown in the drawing) and proceed in the water at a lower speed than the critical one by the repulsive effect due to the rotation of rear high tracks. By proceeding in this way, as its speed reaches the critical one, the planing track of this invention starts to emerge from the water, and the driving track of this invention accelerates by the action of the rolling friction. This enables the amphibious fighting vehicle (100) to fully carry out the mission with the required speed for the Over-The-Horizon amphibious operation.

As shown in the above practice, in case the weight of this invention, the amphibious fighting vehicle (200) amounts to 30 ton and the diameter of tires comprising the track is 0.75 m, it is advantageous for the amphibious fighting vehicle (200) to emerge from the water at its critical speed by setting the immersion line under 0.375 m with the addition of more buoyancy as possible. In other words, if the bottom surface of the fighting vehicle including rear buoy (20) and side buoys (21 and 22) is put "S", the expected height "R" of immersion line can be expressed by the following formula.

$$R = \frac{W}{\rho_W \times g \times S} \quad (11)$$

By the above formula, the volume of required additional buoyancy can be computed.

Figure 3:
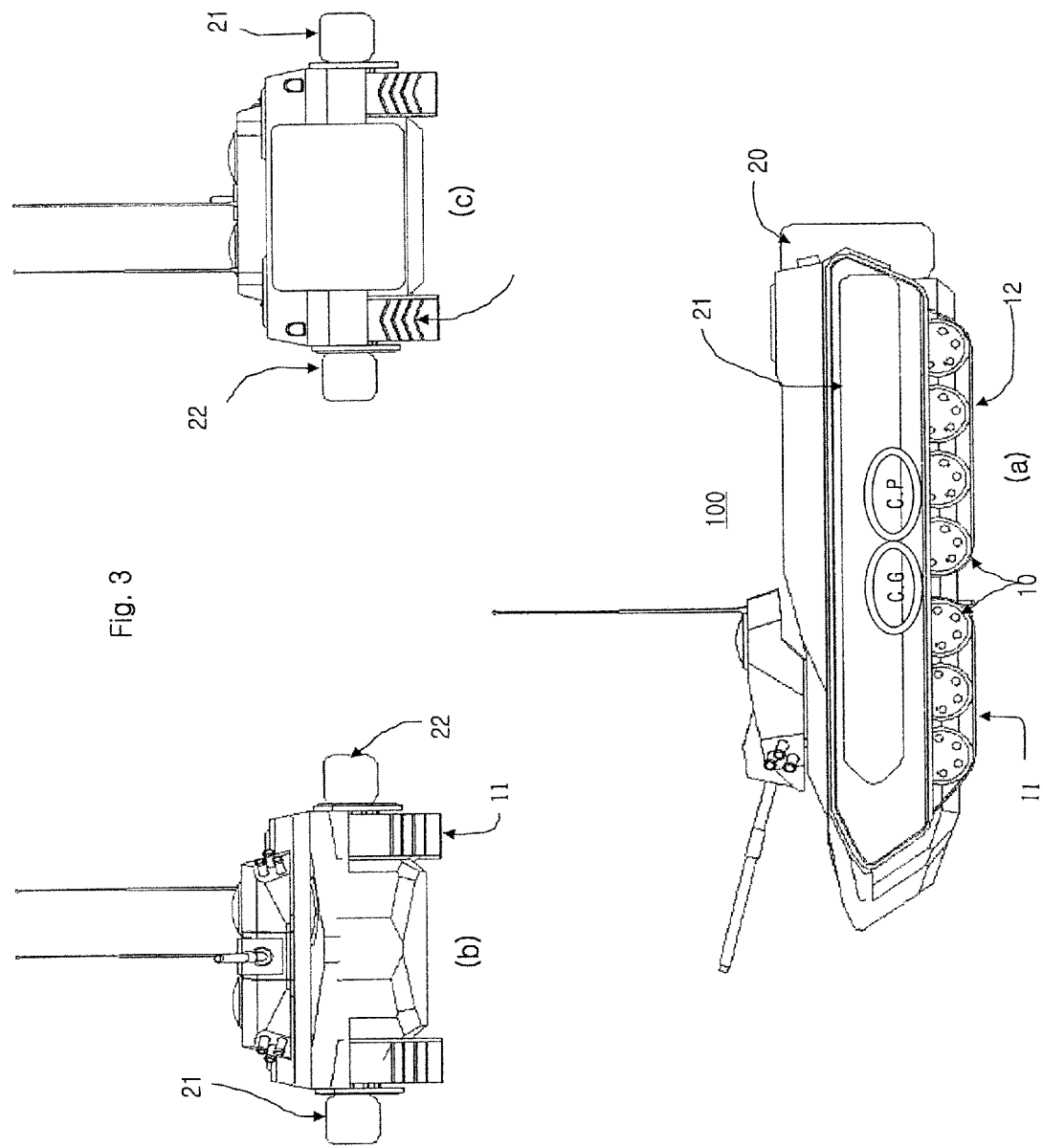
FIG. 3 is the side, frontal and rear perspective views (a, b and c) of the first embodiment provided with additional buoyancies in positions.

FIG. 3 presents the side perspective view (3a) of the amphibious fighting vehicle (100), which is comprised of the two set of left and right tracked belts; the planing track (11) including front 2 rowed 4 tires (10) and the driving track (12) including 2 rowed 5 tires (10) to proceed on the surfaces of land and water. FIG. 3 also shows rear buoy (20) and left hand side buoy (21) as additional buoyancy. Also, the frontal perspective view (3b) shows the front planing track being comprised of the low track (11) and the arrangement of left and right additional buoyancy (21, 22). And the rear perspective view (3c) shows the left and right side additional buoyancy (21, 22) and the sectional view of rear driving track being formed by high track. Here, it is noted that while the amphibious fighting vehicle (100) runs at higher speed on the surface of water, that the center of gravity of the concerning system is kept as low as possible and positioned ahead of the center of pressure, which will increase the driving stability of the concerning system.

Figure 4:
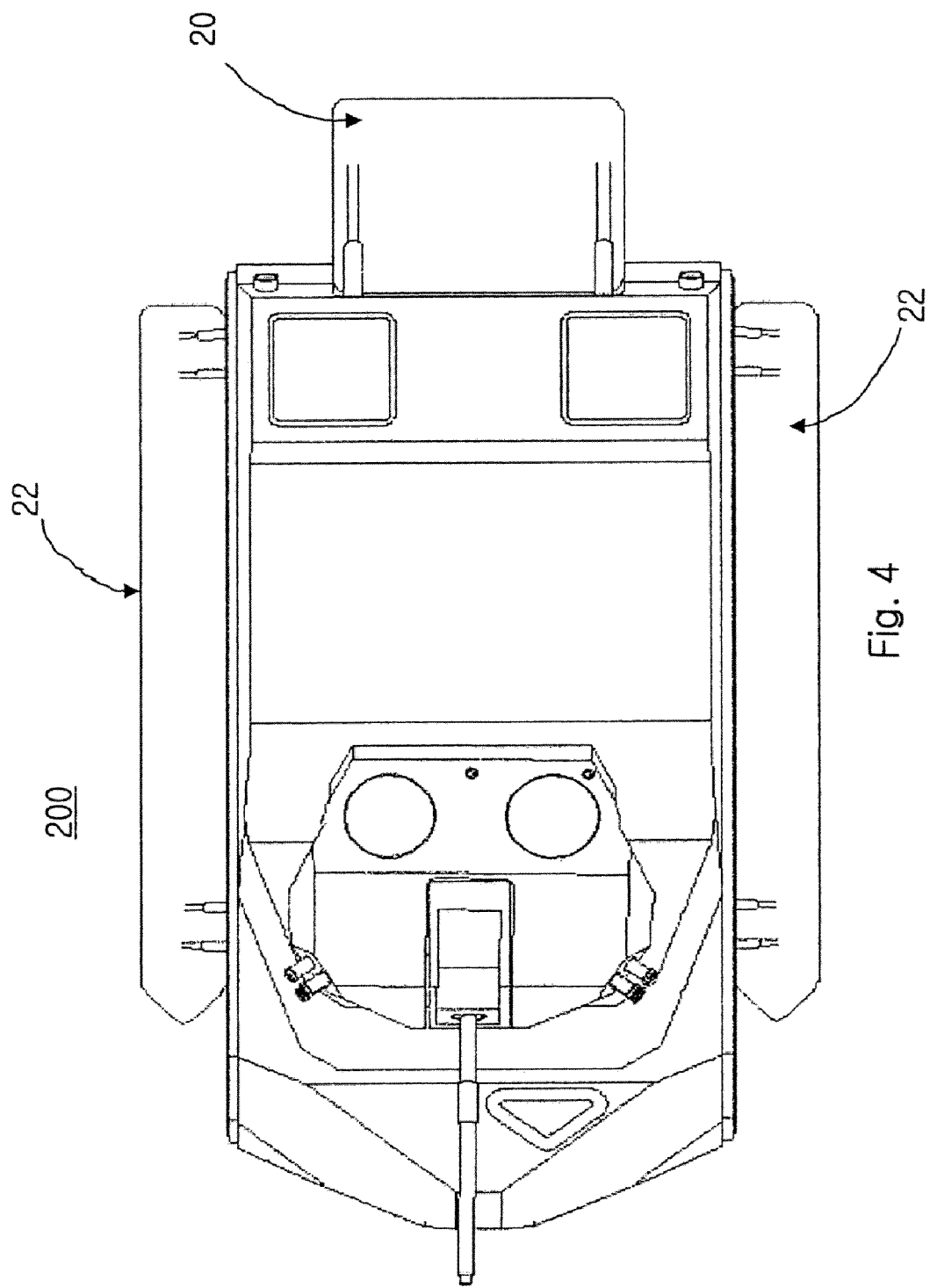
FIG. 4 is a plan perspective view illustrating the additional buoyancies.

FIG. 4 is a plane perspective view of the amphibious vehicle (200) showing such an aspect that rear buoy (20) and left and right side buoy (21,22) are deployed, which is subject to such a case that it proceeds in the water under the critical speed.

Figure 5:
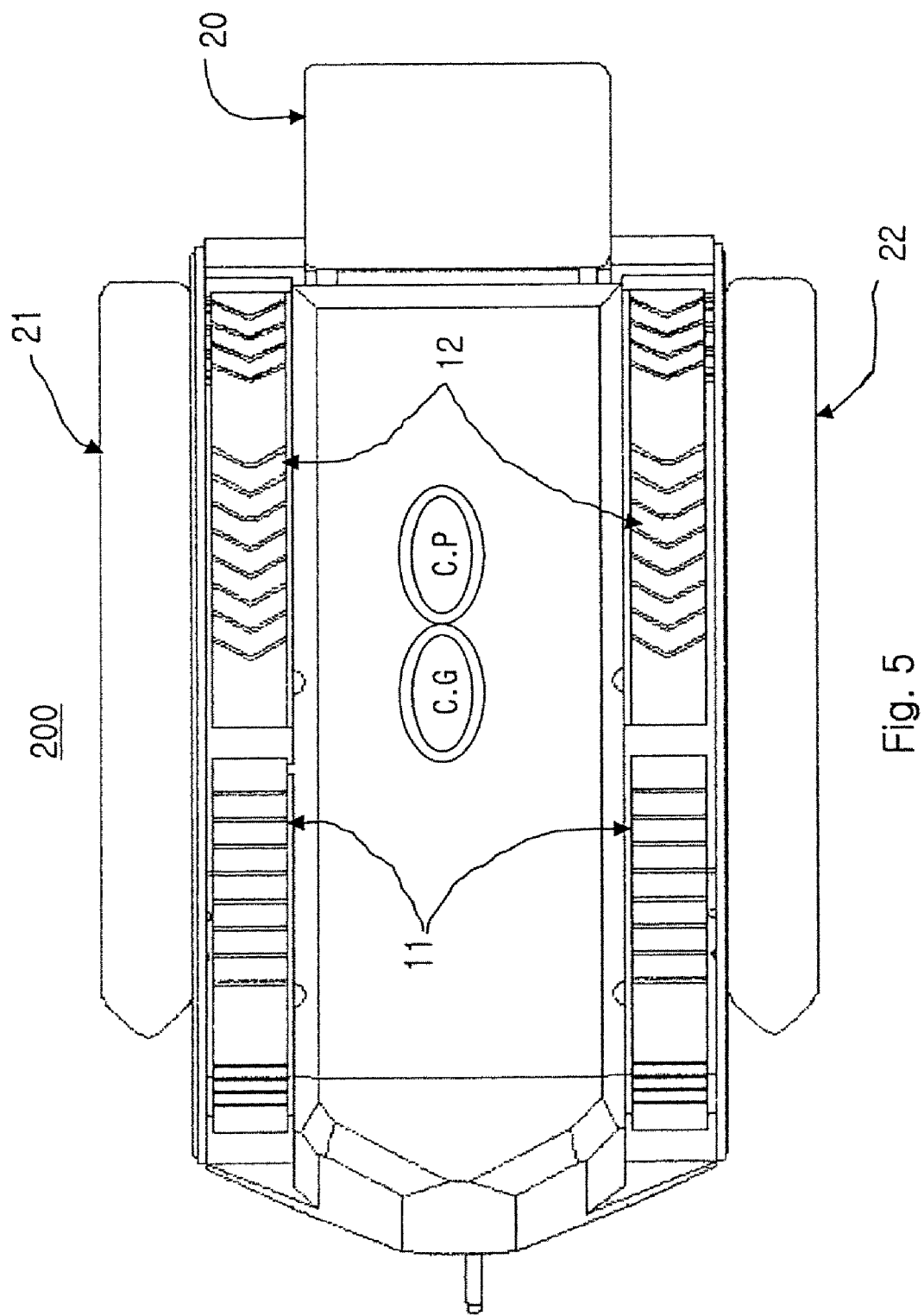
FIG. 5 is a bottom perspective view illustrating the additional buoyancies.

FIG. 5 is a bottom perspective view of the amphibious fighting vehicle (200) showing such a state that while it proceeds in the water under the critical speed, the rear buoy (20) and left and right buoy (21,22) are deployed. It is also shown that the front planing track (11) is forming the belt surface of track as low track and the rear track (12) for its driving is forming the belt surface of the driving track (12). The operational effect of the exemplary embodiment is explained with a practice example of its amphibious operation.

A group of carrier ships that transport both of fighting troops and the amphibious fighting vehicles begin an amphibious operation over the horizon, far away from the shore. Accordingly, the amphibious fighting vehicle that carries a squad of fighting soldier runs onto the surface of water from the unloading deck of the carrier with higher speed than the critical speed (Over 13 km/hr) and accelerates with its weight of 30 ton and runs towards the hostile shore directly on the surface of water with 120 km speed per hour. In case this vehicle starts from the deck under the critical speed, the amphibious fighting vehicle (200) deploys each buoy from the sides and rear, and as its engine output is increased. Further, the rear driving tracked belts accelerate and rotate to go forward by its repulsive action of driving the high tracks that form the driving tracked belts, and the total of tracked belts starts its locomotion on the surface of water as the front planing tracks are emerging at the critical speed (13 km/hr). At this time, after putting the buoys back to the original positions, the vehicle accelerates to move on the surface of water with same higher speed of 120 km per hour. When it approaches to the land surface of shore from the surface of water, it decelerates the driving speed depending on the conditions of land surface and keeps going in order to arrive at the land surface from the water surface.

There, after having suppressed the hostile shore site with the fire power provided of the fighting vehicle, the vehicle commits the fighting soldiers. If the state of battle becomes unfavorable, at the time of retreat, the running speed on land (60 km/hr, which is greater than the critical speed on the water surface of 13 km/hr) is kept, at the same speed, to go on the surface of water, and the vehicle accelerates and moves on the water surface with a top speed of 120 km/hr and finally returns back to the carrier ships. Thus, the amphibious fighting vehicle (100), at a time of amphibious operation, is transferring at higher speed on the surface of water, and can come and go with no hesitation between the surfaces of land and water.

As described above, while the amphibious fighting vehicle is running at a higher speed than the critical speed on the surface of water, the front planing tracked belts are planing the rough wave, and the vehicle moves at higher speed on the surface of water by the propulsion force of rear driving tracked belts. Therefore, the operation, with the present amphibious vehicle, can be initiated over the horizon and leads the amphibious fighting vehicles that are equipped with troops and fire powers to move to the hostile shore within the time of operation.

Also, the described vehicle can proceed to move between the surfaces of land and water in the shore at a speed of environmental adaptation with no hesitation and can reduce attack from the hostile fire power. Further, at a opening time of amphibious operation when the vehicle starts at a higher speed than the critical speed from the unloading deck of carrier ships, it is possible to move on the surface of the water at the start, and at a time of return from the shore to the carrier ships. Accordingly, the operation time may be minimized due to the vehicle's ability to keep its moving speed on land to approach and accelerate onto the surface of water.

Obviously, numerous modification and variations of the present invention are possible in light of the above teachings. It is therefore to be understood that within the scope of the appended claims, the invention may be practiced otherwise than as specifically described herein.

What is claimed is:

1. An amphibious fighting vehicle capable of moving on a water surface, comprising:
   a front planing tracked belt disposed on a front portion of the amphibious fighting vehicle;
   a rear driving tracked belt;
   side buoys disposed on lateral sides of the amphibious fighting vehicle that assist in setting an immersion line of the amphibious fighting vehicle at a predetermined value; and
   a rear buoy disposed on a rear end of the amphibious fighting vehicle,
   wherein the front planing tracked belt and the rear driving tracked belt are propelled at a speed sufficient for movement on the water surface and a land surface,
   wherein the planing tracked belt and the rear driving tracked belt run on the surface of the water when the front planing tracked belt and the rear driving tracked belt are driven above a critical speed,
   wherein the side buoys and the rear buoy are deployed into the water under the critical speed, and
   wherein when the amphibious fighting vehicle is operated over the critical speed, the side buoys and the rear buoy are retracted from the water.

2. The amphibious fighting vehicle of claim 1,
   wherein the front planing tracked belt includes four tires provided in a row, that are steered by a hydraulic braking system, and
   wherein the front planing tracked belt emerges onto the water surface of water and moves on the water surface via rolling friction when driven above the critical speed.

3. The amphibious fighting vehicle of claim 1,
   wherein the rear driving tracked belt with a high track includes five tires provided in a row, which are driven by a driving axle through transmission of the engine, and
   wherein under the critical speed the rear driving tracked belt is propelled by a reactive action of the high track in the water, and once the rear driving tracked belt arrives at a speed higher speed than the critical speed the rear driving tracked belt runs on the water surface by rolling friction.

4. The amphibious fighting vehicle of claim 1,
   wherein the side buoys and the rear buoy which lower the immersion line are deployed under the critical speed for additional buoyancy,
   wherein when the amphibious fighting vehicle is operated over the critical speed, the side buoys and the rear buoy retract to facilitate the amphibious fighting vehicle to move at higher speed on the water surface.

5. The amphibious fighting vehicle of claim 1, wherein power required to operate the amphibious fighting vehicle at a maximum speed on the water surface is determined based on a frontal area of the amphibious fighting vehicle, the maximum speed on the water surface, weight of the amphibious fighting vehicle, and a density of air.

6. The amphibious fighting vehicle of claim 1, wherein a center of gravity of the amphibious fighting vehicle is forward of a center of pressure of the amphibious fighting vehicle upon the water surface.

* * * * *